United States Patent
Zoffer

Patent Number: 5,921,389
Date of Patent: Jul. 13, 1999

[54] PROTECTIVE COVER FOR WHEELED VEHICLES

[75] Inventor: John Zoffer, 35-3A Richmond Blvd., Ronkonkoma, N.Y. 11774

[73] Assignees: John Zoffer; a part interest; John Goodger, both of Ronkonkoma, N.Y.; a part interest

[21] Appl. No.: 09/062,931

[22] Filed: Apr. 20, 1998

[51] Int. Cl.⁶ ................................................. B65D 85/68
[52] U.S. Cl. ........................... 206/335; 150/167; 296/136
[58] Field of Search ............................ 206/335; 150/166, 150/167, 901; 383/97, 99; 296/130, 136

[56] References Cited

U.S. PATENT DOCUMENTS

| | | | |
|---|---|---|---|
| 3,820,651 | 6/1974 | Levy | 150/166 |
| 3,884,523 | 5/1975 | Allen | 150/166 |
| 4,315,535 | 2/1982 | Battle | 206/335 |
| 5,217,275 | 6/1993 | Ridge | 150/166 |
| 5,372,169 | 12/1994 | Norton et al. | 150/167 |
| 5,533,616 | 7/1996 | Crowfoot | 206/335 |
| 5,673,961 | 10/1997 | Mazzarelli | 150/166 |
| 5,788,317 | 8/1998 | Nation | 150/166 |

*Primary Examiner*—Paul T. Sewell
*Assistant Examiner*—Luan K. Bui
*Attorney, Agent, or Firm*—Alfred M. Walker

[57] ABSTRACT

A portable cover encloses a wheeled vehicle, such as a motorcycle, bicycle, wheelbarrow or a lawnmower. The portable cover is designed with light weight material. The cover includes a base made of a rubber or rubber like, plastic or plastic like material, or other pliable type material that is waterproof and weather proof. The cover material is fastened by a zipper, latch, VELCRO®, or other securing device. The fastener may optionally include a lock. The protective cover is approximately 70–90 inches in length. The protective cover protects the wheeled vehicle, such as a motorcycle, from the elements of the outdoors and it is portable and compact in nature.

12 Claims, 3 Drawing Sheets

“5,921,389”

PROTECTIVE COVER FOR WHEELED VEHICLES

FIELD OF THE INVENTION

The present invention relates to protective covers that enclose a wheeled vehicle such as a motorcycle, a bicycle, a wheel barrow or a lawn mower. More particularly, the present invention relates to a protective cover which wraps around and encloses the entire motorcycle, without having to lift up the wheels of the motorcycle.

BACKGROUND OF THE INVENTION

Motorcycles are often stored outdoors, especially at a residence without a garage, such as an apartment, or at a recreational vacation site.

In order to protect the motorcycle from the elements of weather, often tarpaulins and other sheet materials are partially wrapped around the motorcycle. However, because of the weight of a motorcycle, it is difficult to lift up the motorcycle to enclose its bottom.

As a result, wind can blow ice and debris against the exposed lower portion of the motorcycle. Furthermore, the motorcycle which is not fully enclosed is more prone to vandalism damage.

Among various related background art patents include U.S. Pat. No. 5,445,200 of Celestino for a protective cover which is fully encloses a non-motorized bicycle. However, in order to enclose the bottom of the bicycle, each wheel must be lifted up into hollow wheel cover portions. However, a bicycle weighs much less than a motorcycle, and the bicycle wheels can be lifted up with ease. Such is not the case with a motorcycle wheel, which bears the entire weight of a motorcycle, which is too heavy for one person to comfortably lift up.

Another bicycle cover is described in U.S. Pat. No. 4,976,389 of McLellan, which covers a bicycle being transported atop a car roof.

In view of this weight problem of a motorcycle, U.S. Pat. No. 3,884,523 of Allen attempts to solve these problems by providing a foldable cover which folds into a motorcycle seat when not used, and which unfolds to spread over and cover the top of the motorcycle and drops down over the tops and sides of the wheels. However, the cover of Allen 523 does not fully enclose the motorcycle. U.S. Pat. No. 3,659,872 of Warner also discloses a partial cover for a motorcycle which is open at the bottom U.S. Pat. No. 5,109,942 of Akimori, U.S. Pat. No. 4,178,033 of Muth, and U.S. Pat. No. 4,198,093 also of Muth, disclose motorcycle vehicle body covers which includes an exterior fairing surface.

U.S. Pat. No. 4,792,040 of Wagstaff describes a combination rain suit and motorcycle cover for a motorcycle driver and a motorcycle. When the motorcycle is being driven, the cover covers the driver. When the motorcycle is parked, the cover covers the parked motorcycle.

U.S. Pat. No. 4,283,084 of Gallagher discloses a foldable weight cover for covering the seat and motor portion of a motorcycle from above, but not the wheels or handlebar.

U.S. Pat. No. 4,440,436 of Giddens describes a canopy cover for covering a driver riding on a motorcycle.

U.S. Pat. No. 5,282,502 of Ballard discloses a bicycle cover which covers most of a motorcycle, except for the bottom of the wheels.

U.S. Pat. No. 5,562,139 of Cseri discloses a stretchable cover for the open portion of a motorcycle.

However, none of these covers can completely cover a motorcycle without lifting up the heavy weight of the motorcycle.

OBJECTS OF THE INVENTION

It is therefore, an object of the present invention to provide a motorcycle cover which completely covers the underside and wheels of a wheeled vehicle such as a motorcycle without lifting up the full weight of the wheeled vehicle, such as the motorcycle.

It is also an object of the present invention to provide a weather proof motorcycle cover which can be driven onto and then wrapped over a motorcycle from beneath.

It is yet another object of the present invention to provide a weather proof cover which is convenient to mount over or dismount from a wheeled vehicle, such as a motorcycle, bicycle, wheel barrow or lawn mower.

It is yet a further object to improve over the disadvantages of the background art motorcycle covers.

SUMMARY OF THE INVENTION

In keeping with these objects and others which may become apparent, the present invention is a portable, complete enclosure for a motorcycle. It is designed with light weight material. The base is made of a rubber or rubber like, plastic or plastic like material, or other pliable type material that is waterproof and weather proof.

The cover material is fastened by a zipper, latch, velcro, or other securing device. The fastener may optionally include a lock. The unit will be approximately 70–90 inches in length.

The purpose of the present invention is to protect a motorcycle from the elements of the outdoors and which is portable and compact in nature.

To install the cover without lifting up the weight of the motorcycle, the motorcyclist rides the motorcycle onto the base of the device while the cover is open, dismounts the motorcycle, then secures the cover, protecting the motorcycle.

The motorcycle enclosure cover enables the owner to feel comfortable knowing that when the vehicle is enclosed therein, he or she will never have to clean or wipe down rain spots, dust, or mildew off of a clean and shining vehicle.

The cover can be used for both interior and exterior purposes.

The motorcycle cover includes a rubber platform, which to park the motorcycle on. The rubber platform is made of a waterproof non skid surface, to ride vehicle onto. This platform material is semi-flexible. A second layer above the platform is a heat resistant material. This material is connected to the rubber platforms and rises approximately $1/4$–$1/3$ of the way to the top of the motorcycle cover. This material is needed to prevent burning from the motorcycle exhaust system. This material is also waterproof, water resistant, and flexible. The upper third roof portion is made of a flexible water resistant or waterproof material. This is the final material to enclose the bike.

Attached to an outer edge of the roof portion is a seam fastener, such as for example, a zipper or zip lock enclosure system. This enclosure system is preferably a waterproof, flexible, and durable. It encloses the motorcycle into the motorcycle cover and optionally contains a lock.

DESCRIPTION OF THE DRAWINGS

The present invention can best be understood in connection with the accompanying drawings, in which.

DETAILED DESCRIPTION OF THE PREFERRED EMBODIMENT

Figure 1:
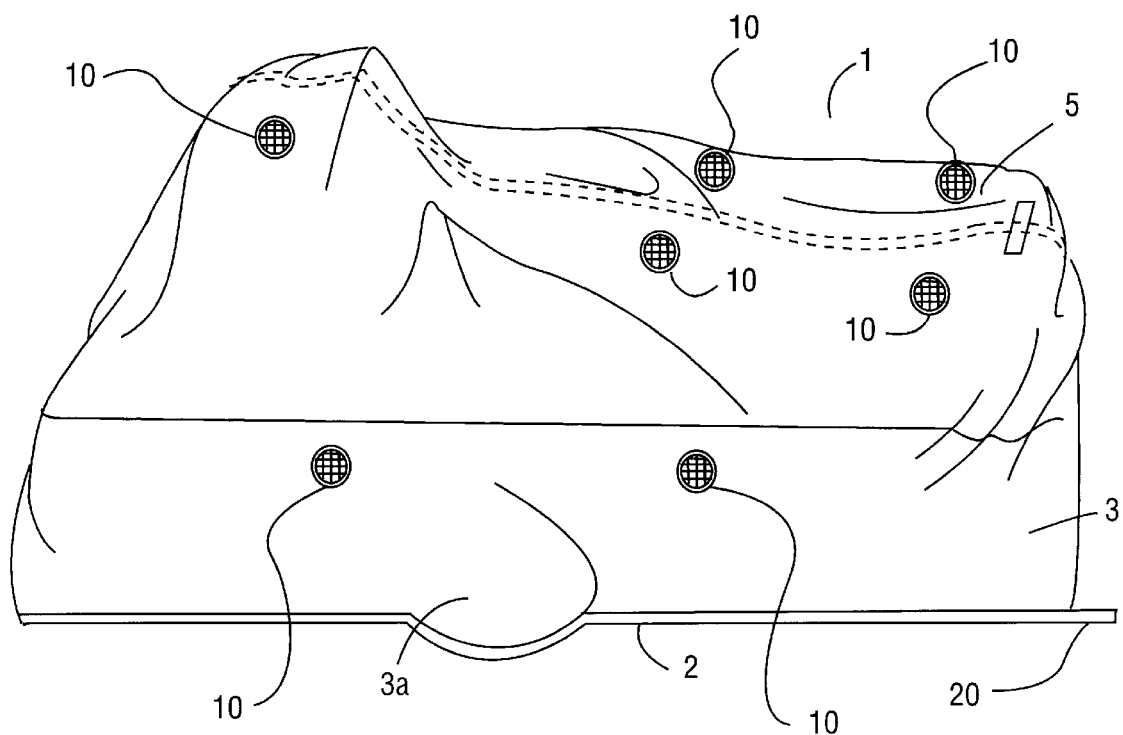
FIG. 1 is a right side elevational view of the motorcycle cover of the present invention, shown in place over a motorcycle.

As shown in FIGS. 1–4, protective cover 1 for a two-wheeled cycle having a pair of handlebars, includes a flexible base platform 2 having at peripheral, outer lateral edges thereof, a pair of waterproof heat resistant mid panels 3, 4. Mid panels 3, 4 have at peripheral outer lateral edges thereof, a further pair of waterproof, weather resistant roof panels 5, 6 joined at a common edge by linearly extending enclosure fastener 7, such as a zipper, which surrounds and overlies the cycle. Cover 1 also enclose the handlebars. Mid panels 3, 4 are joined at a proximal edge to base platform 2, and are joined of distal ends thereof to proximal edges of roof panels 5, 6, which said roof panels 5, 6 are joined at distal edges thereof by enclosure fastener 7. Mid panel 3 optionally includes kickstand cover portion 3a. A flap 2a extends from the rear of platform 2.

Figure 2:
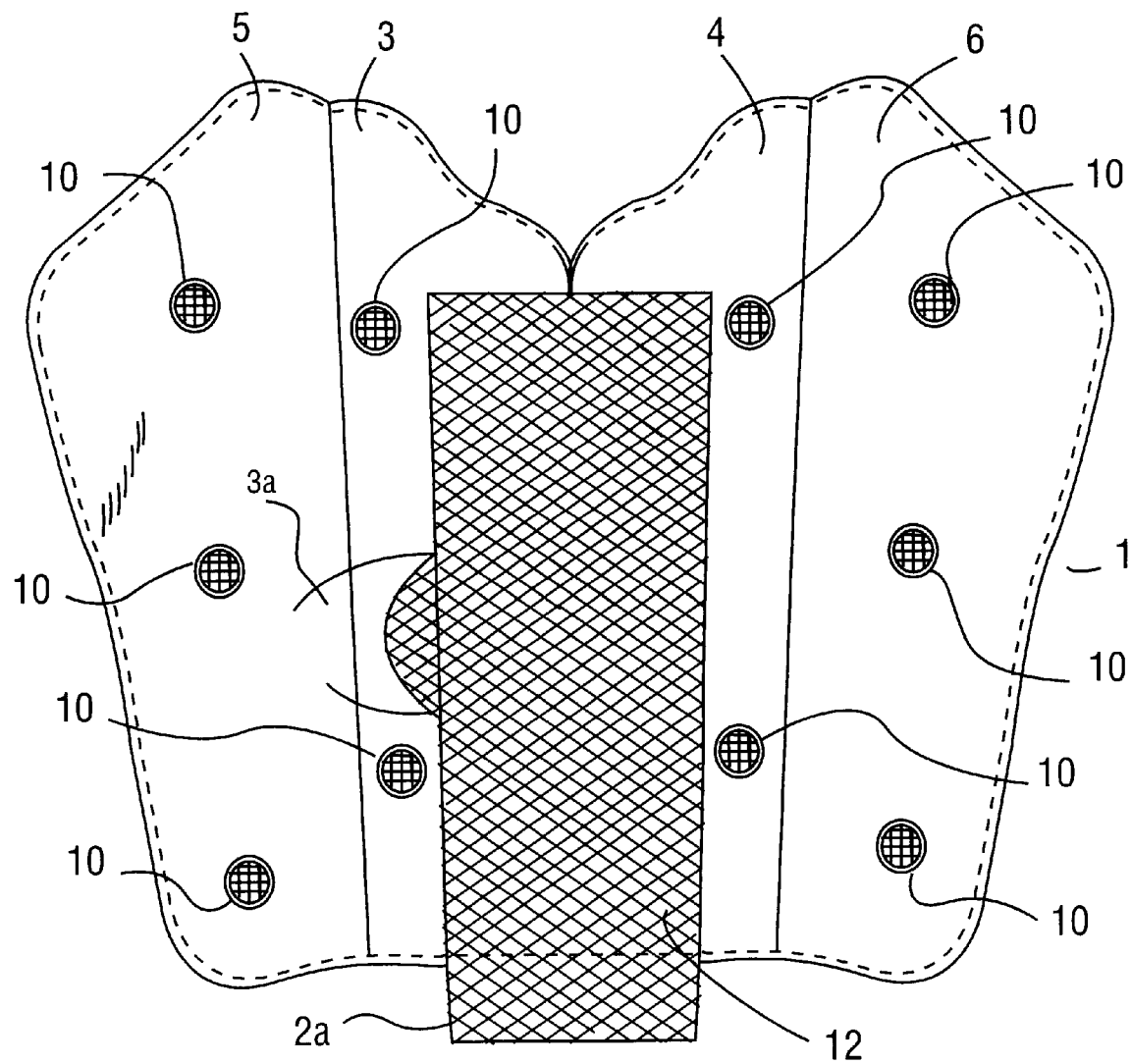
FIG. 2 is a top plan view of the present invention, shown in an open position prior to use.
Figure 3:
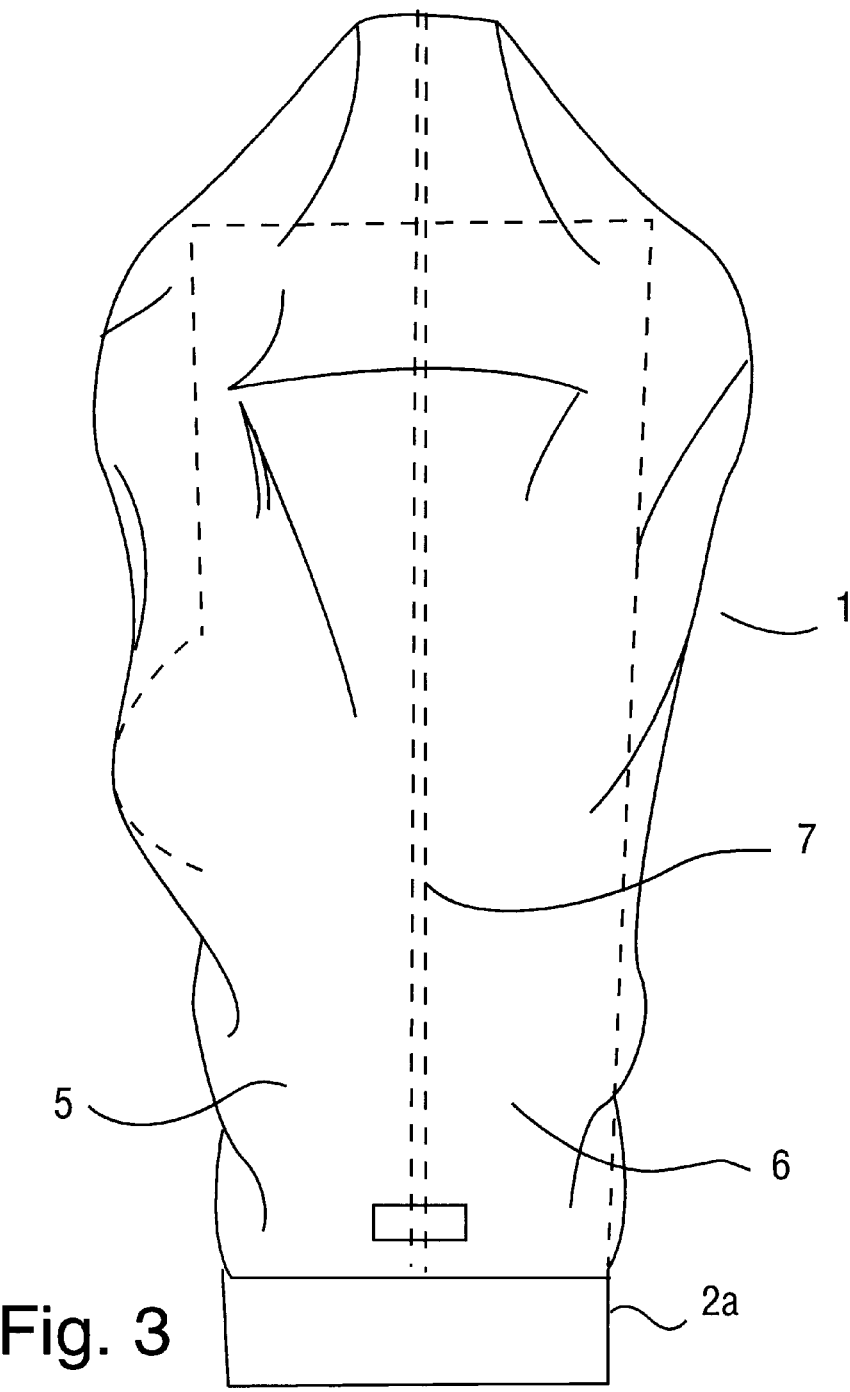
FIG. 3 is a top plan view of the present invention, shown in a closed position, shown in place over a motorcycle; and, FIG. 4 is a side elevational view of a vent for the motorcycle cover of the present invention.

Protective cover 1 completely surrounds a motorcycle, by virtue of the fact that a motorcycle is driven over platform 2 of protective cover 1, when protective cover 1 is open and flat on the ground, as shown in FIG. 2.

After the motorcycle is driven over platform 2, the driver surrounds one side of the motorcycle with mid panel 3 and roof panel 5 and the other side of the motorcycle with mid panels 4 and roof panel 6. Roof panels 5, 6 are then joined by enclosure fastener such as a zipper, along a common edge, to completely enclose the motorcycle.

Enclosure fastener 7 may also be a latch or a "hook and loop" VELCRO® type fastener.

For durability to withstand being constantly driven over by the wheels of a motorcycle, platform 2 is preferably made of a flexible waterproof material, such as rubber.

The heat resistant panels 3, 4 are made of a heat resistant canvas or tarpaulin type coated with a heat resistant, and also waterproof, coating.

Preferably roof panels 5, 6 are made of a waterproof rubberized plastic or canvas material.

While a rubberized canvas material or a fiberglass reinforced rubberized material is serviceable for both the upper sections 5 & 6 and the lower heat resistant sections 3 & 4, other plastic or rubberized materials would also serve. One class of materials available from Shell Chemical Company under the trade name Kraton G is an example of rubbery Styrenic Block Copolymers. These are available in a variety of different hardness grades. The entire cover can be made of two or three hardness grades of this thermoplastic rubber with the hardest grade for the floor section 2 and more flexible (softer) grades for the two upper sections. This material will routinely handle temperatures over 100 degrees Celsius or 212 degrees F. If a lighter material such as Mylar is used for the sides, the lower heat resistant portions can be lined with a layer of silicone rubber sheet which can sustain temperatures over 250 degrees C. (482 F.). Another material that is a candidate for the entire side portion or as a liner for heat sensitive parts is a thermoplastic polyurethane such as Estane available from B.F. Goodrich of Cleveland, Ohio. This latter material has heat resistant similar to Kraton.

Figure 4:
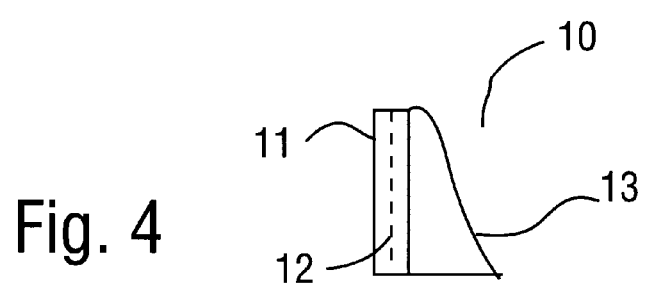

A number of vermin resistant air vents 10 are shown in FIG. 1. At least one vent is preferred. These are used to help dissipate heat and to prevent the dangerous build-up of gasoline vapors. FIG. 4 shows the construction which consists of a rigid plastic ring 11, a metal screen 12 and a loose waterproof outer flap 13. The ring 11 is either sewn, adhesively bonded or thermally or ultrasonically bonded to the side wall material.

In another embodiment, side panels 3, 4 and roof panels 5, 6 may be made of the same material, and may encompass integrated one piece panels.

Moreover, cover 1 may also cover a bicycle (not shown) or other wheeled vehicle such as a wheel barrow (not shown) or lawn mower (not shown).

Other modifications may also be made to the present invention without departing from the scope of the invention, as noted in the attached claims.

I claim:

1. A one piece, lightweight portable protective cover which is compact when not in use in combination with a motorcycle comprising:

a base platform of lightweight flexible material with a non-skid surface extending the full length of the wheels of said motorcycle from the rear to front of said motorcycle;

a pair of flexible side panels integral with said platform extending from the rear of said platform to the front of said platform and forming a generally V-shaped configuration extending and spreading outwardly from the front and middle of said platform, said side panels being made from a heat resistant material and having a waterproof coating;

a pair of flexible roof panels integral with said side panels extending outwardly a sufficient distance to completely enclose said motorcycle with the outer edges of said roof panels meeting to enclose said motorcycle, said roof panels being made of waterproof material;

means along the outer edges of said roof and side panels to releasably join said panels wherein the motorcycle is completely enclosed within said cover; and said platform having a protruded portion with a cover portion for a kickstand.

2. The protective cover as in claim 1 wherein said base platform i s a flexible waterproof member.

3. The protective cover as in claim 2 wherein said base platform is rubber.

4. The protective cover as in claim 1 wherein said flexible panels are plastic.

5. The protective cover as in claim 1 wherein said flexible panels are canvas.

6. The protective cover as in claim 1 wherein said protective cover is made of at least one fiberglass reinforced rubberized copolymer.

7. The protective cover as in claim 1 wherein said protective cover is made of a thermoplastic polyurethane.

8. The protective cover as in claim 1 wherein said protective cover is made of a styrenic block copolymer.

9. The protective cover as in claim 1 further comprising at least one air vent.

10. The protective cover as in claim 1 wherein said air vent comprises a ring having a screen thereon.

11. The protective cover as in claim 1 having a ground level flap extending from the rear of said platform which remains extended when said motorcycle is fully enclosed.

12. A one piece, lightweight portable protective cover which is compact when not in use in combination with a motorcycle comprising:

- a base platform of lightweight flexible material with a non-skid surface extending the full length of the wheels of said motorcycle from the rear to front of said motorcycle;
- a pair of flexible side panels integral with said platform extending from the rear of said platform to the front of said platform and forming a generally V-shaped configuration extending and spreading outwardly from the front and middle of said platform;
- a pair of flexible roof panels integral with said side panels extending outwardly a sufficient distance to completely enclose said motorcycle with the outer edges of said roof panels meeting to enclosed said motorcycle, said roof panels being made of waterproof material;
- joining means along the outer edges of said roof and side panels to releasably join said panels wherein the motorcycle is completely enclosed within said cover.

* * * * *